No. 873,756. PATENTED DEC. 17, 1907.
G. W. KING, H. J. BARNHART & C. B. KING.
STEAM SHOVEL.
APPLICATION FILED SEPT. 8, 1904.
8 SHEETS—SHEET 1.
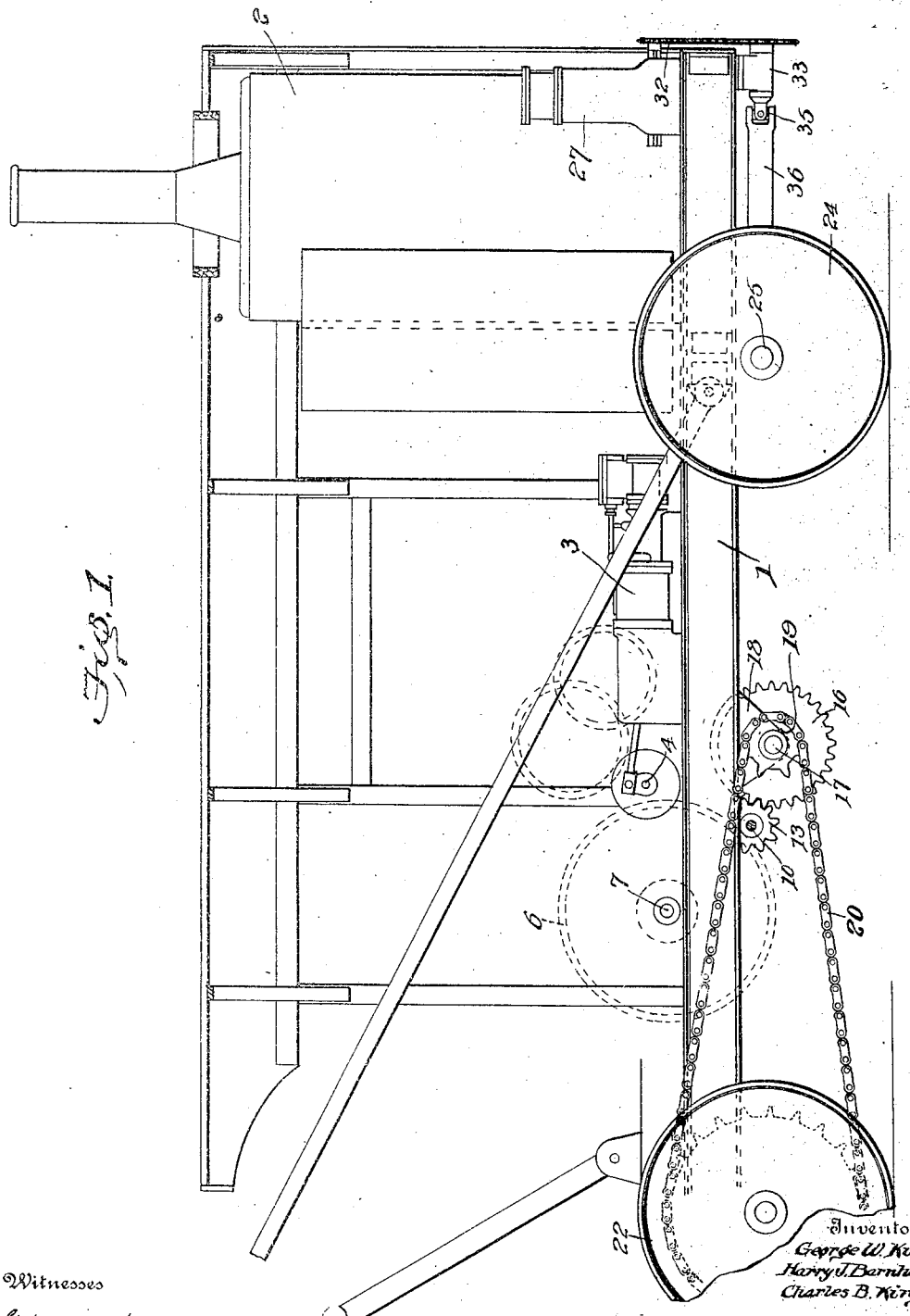
Fig. 1.
Witnesses
G. Howard Walmsley.
Irvine Miller.
Inventors
George W. King,
Harry J. Barnhart,
Charles B. King,
By 
Attorney No. 873,756. PATENTED DEC. 17, 1907.
G. W. KING, H. J. BARNHART & C. B. KING.
STEAM SHOVEL.
APPLICATION FILED SEPT. 8, 1904.

8 SHEETS—SHEET 2.

No. 873,756. PATENTED DEC. 17, 1907.
G. W. KING, H. J. BARNHART & C. B. KING.
STEAM SHOVEL.
APPLICATION FILED SEPT. 8, 1904.

8 SHEETS—SHEET 4.

No. 873,756.

PATENTED DEC. 17, 1907.

G. W. KING, H. J. BARNHART & C. B. KING.
STEAM SHOVEL.
APPLICATION FILED SEPT. 8, 1904.

8 SHEETS—SHEET 6.

Witnesses
G. Howard Walmsley.
Ironie Miller

Inventors
George W. King,
Harry J. Barnhart,
Charles B. King,
By H. A. Toulmin
Attorney No. 873,756. PATENTED DEC. 17, 1907.
G. W. KING, H. J. BARNHART & C. B. KING.
STEAM SHOVEL.
APPLICATION FILED SEPT. 8, 1904.

8 SHEETS—SHEET 8.

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

STEAM-SHOVEL.

No. 873,756.      Specification of Letters Patent.      Patented Dec. 17, 1907.

Application filed September 8, 1904. Serial No. 223,696.

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Steam-Shovels and the Like, of which the following is a specification, reference being had therein to the accompanying drawings.

This invention relates to steam shovels and the like, and more particularly to the means whereby they are propelled and guided.

The main object of our present invention is to provide a structure of this character which shall be adapted for use on ordinary roadways or surfaces other than railways, being capable, however, of being readily mounted on the railway trucks usually employed when the apparatus is to be used in connection with a railway, and being adapted to be self-propelling in either case, provision being made for readily guiding the same when used elsewhere than on said railways.

To the above ends our invention consists in certain novel features which we will now proceed to describe, and will then particularly point out in the claims.

Figure 2:
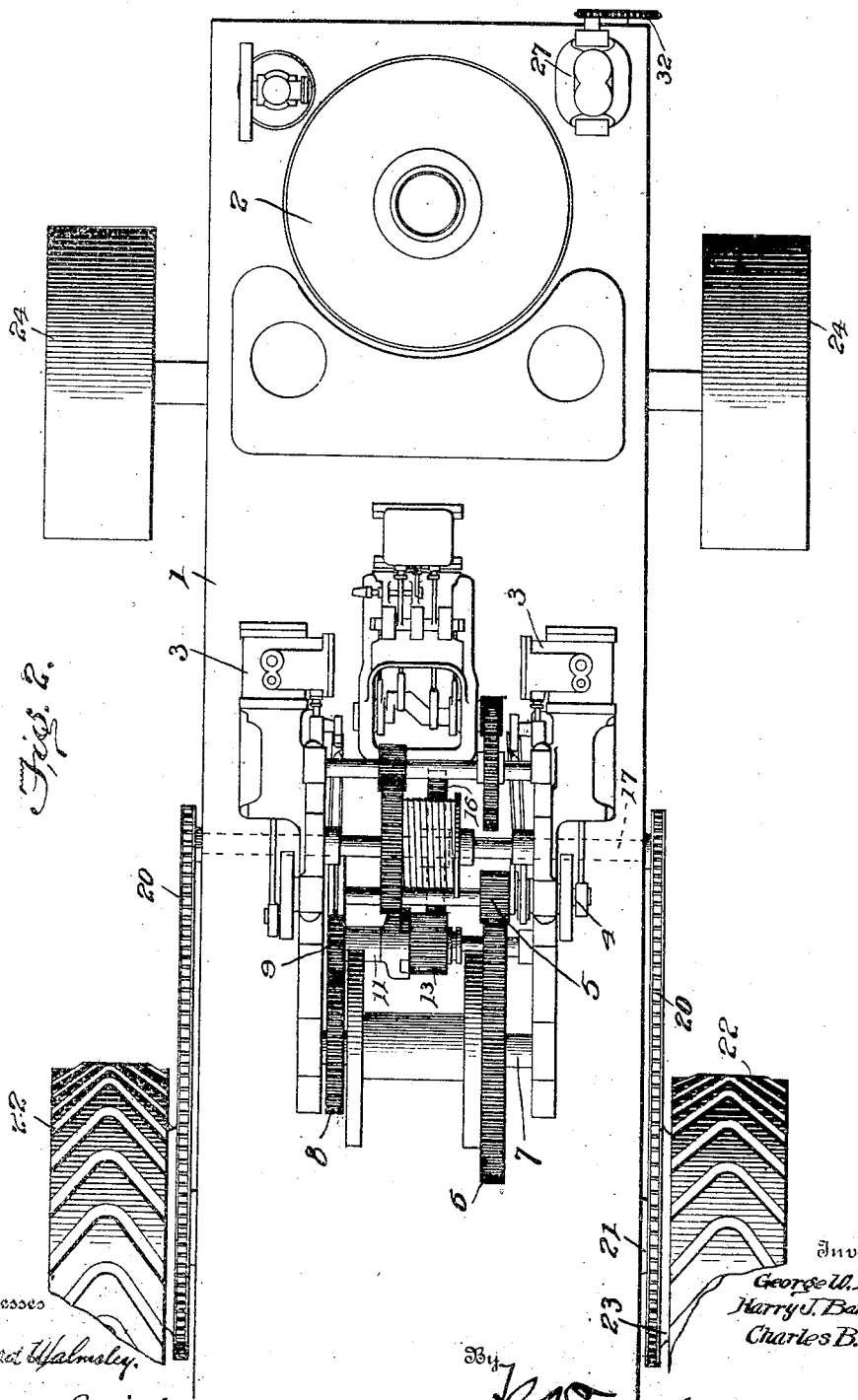
Figure 3:
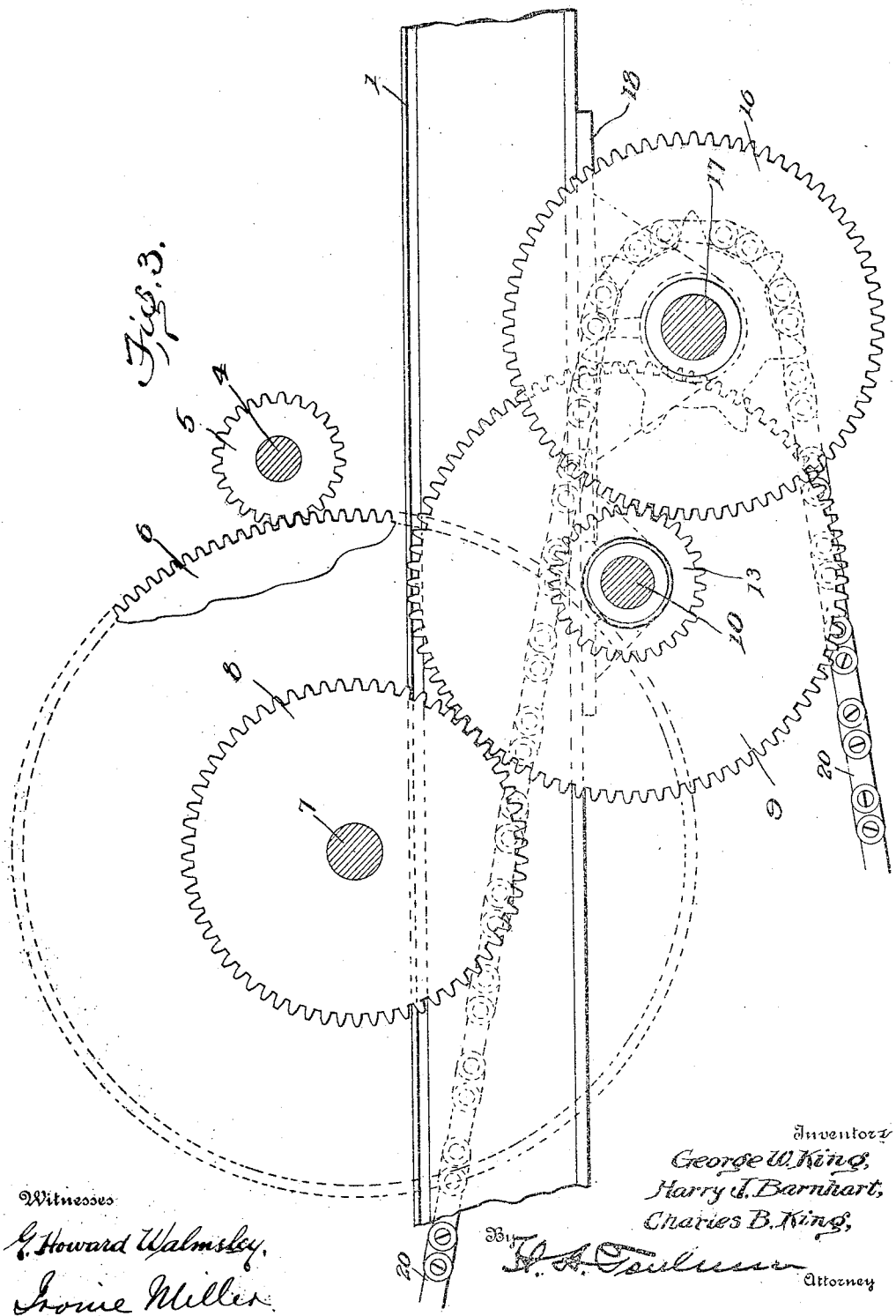
Figure 4:
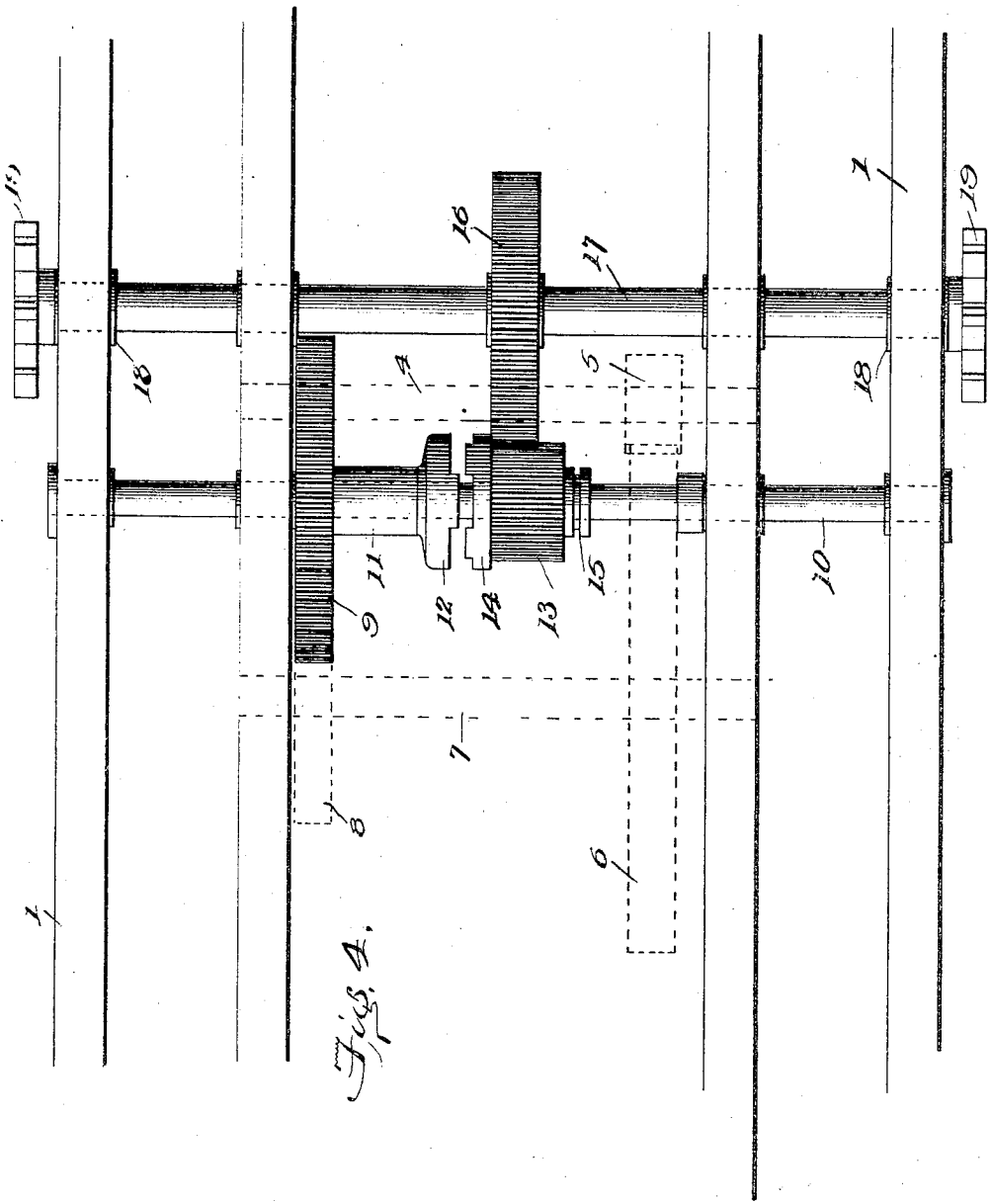
Figure 5:
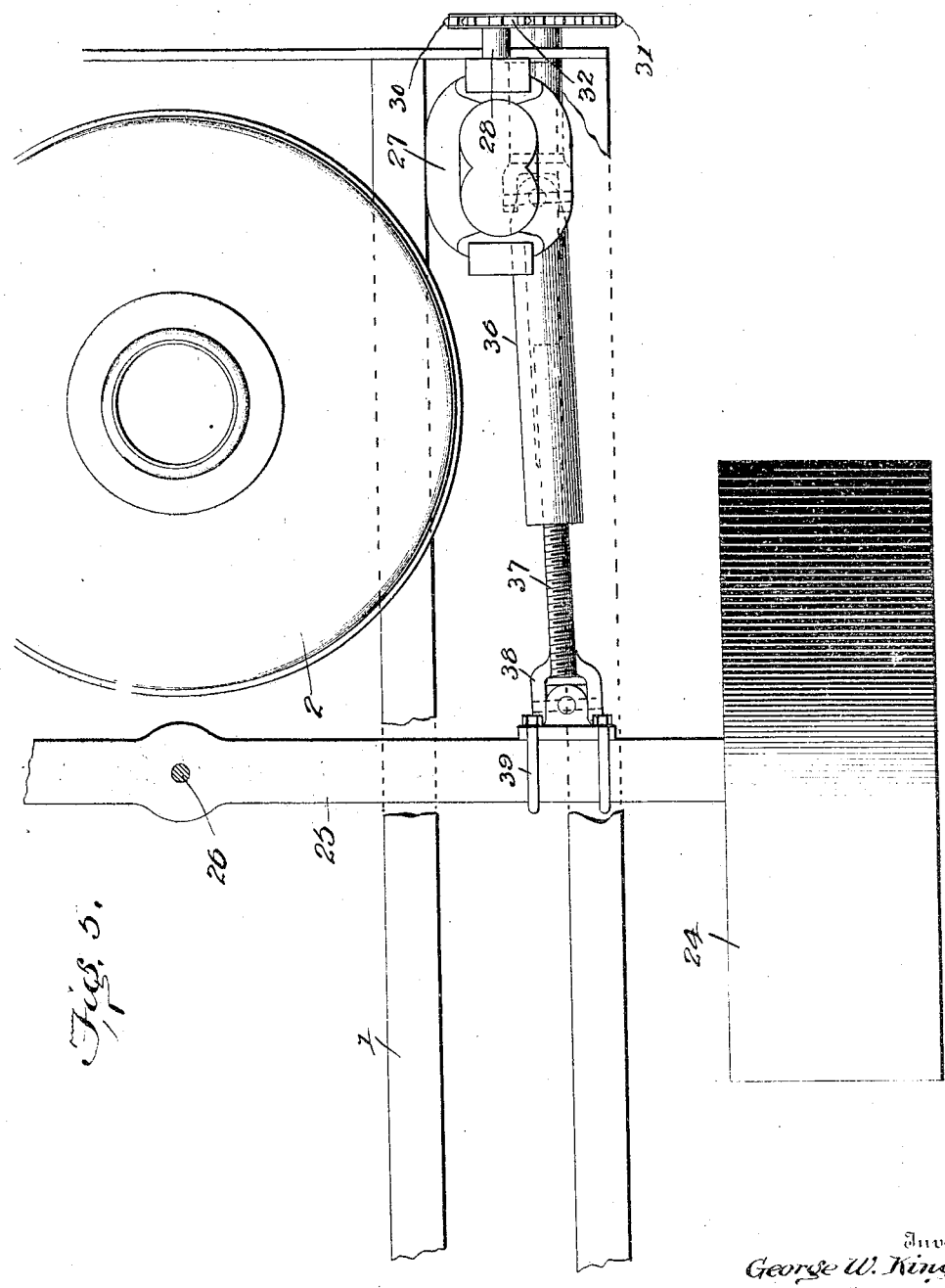
Figure 6:
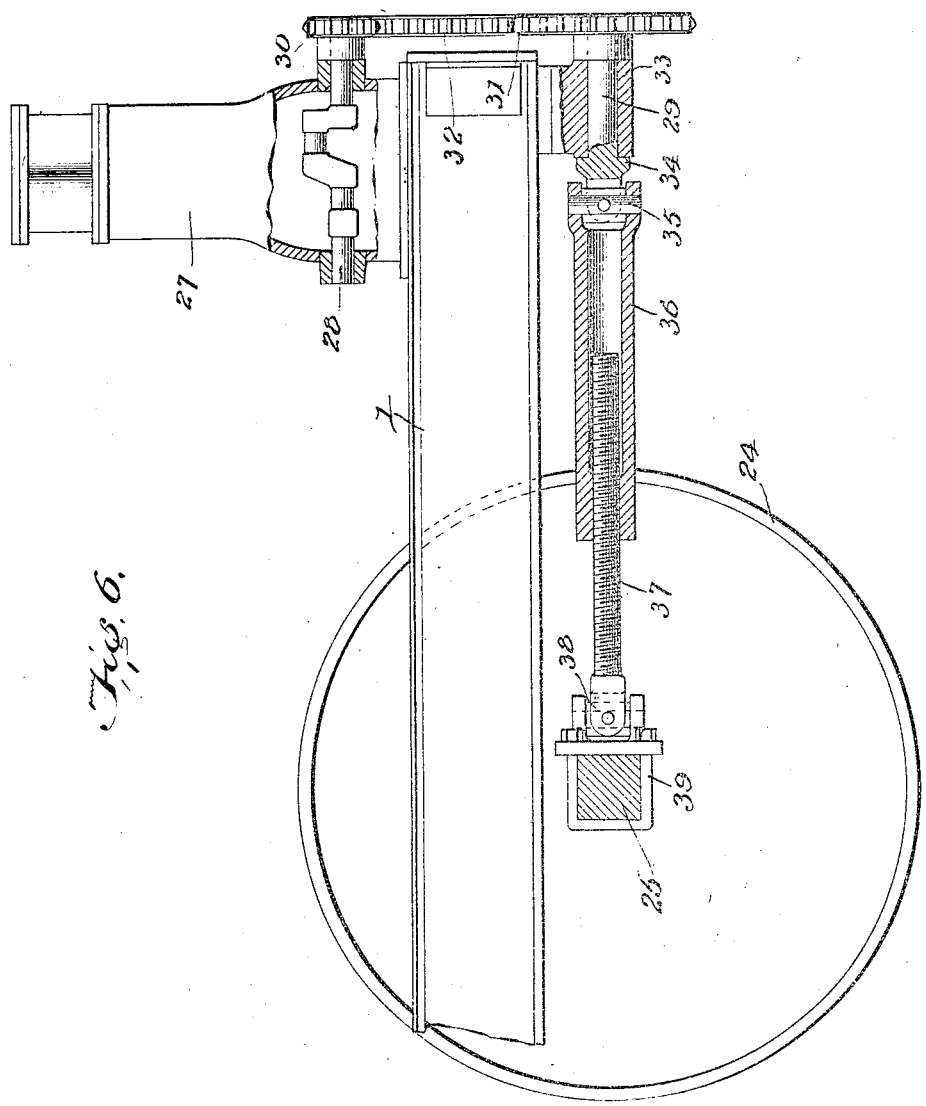
Figure 7:
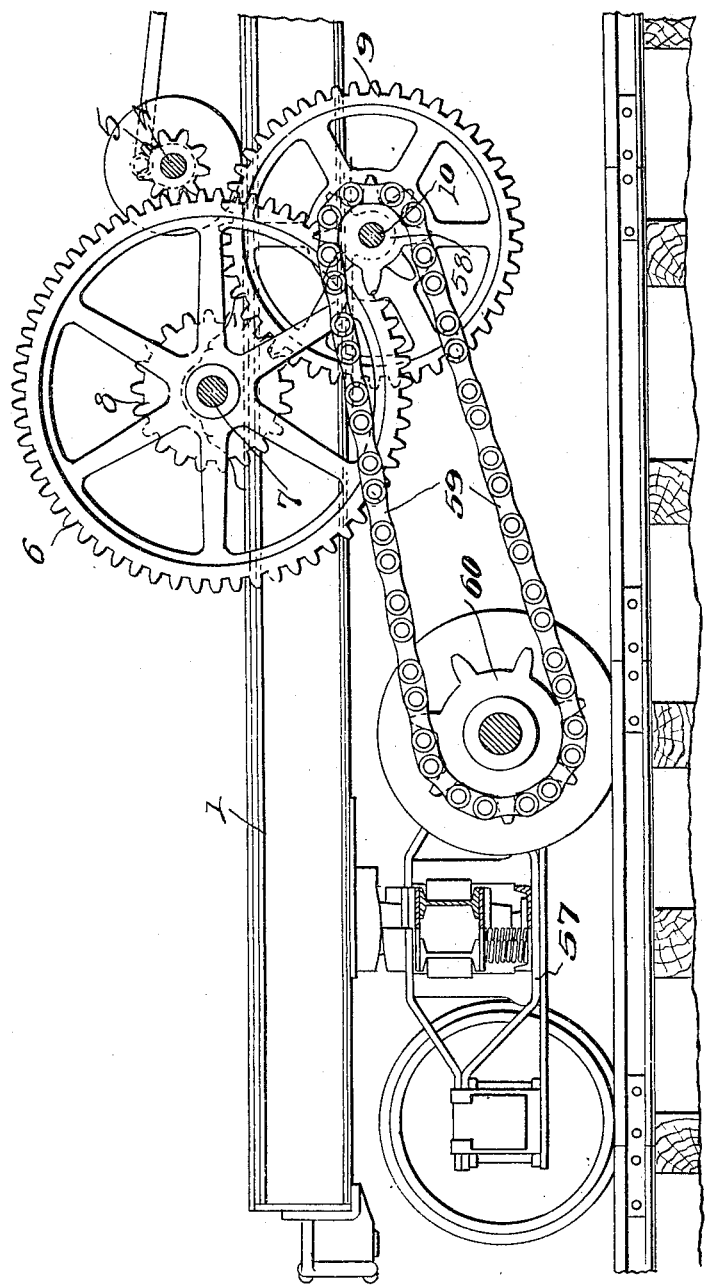
Figure 8:
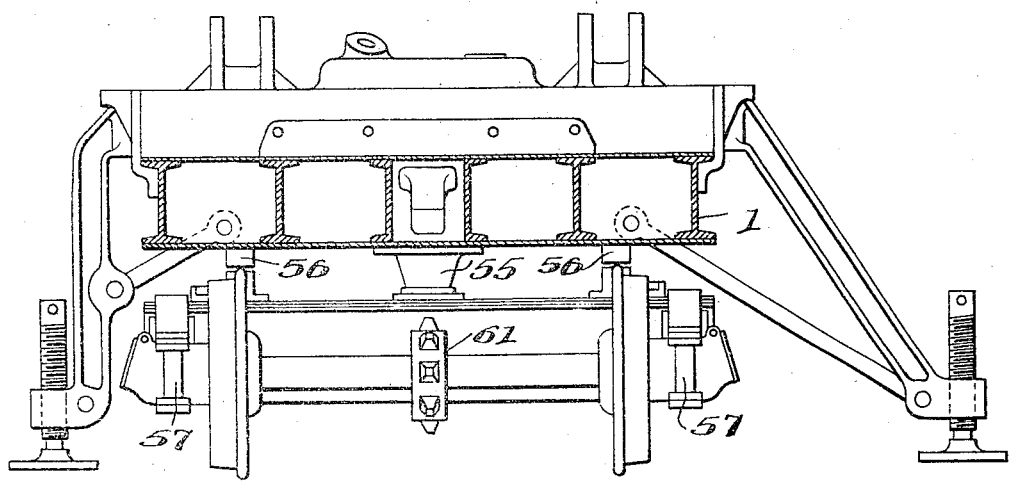
Figure 9:
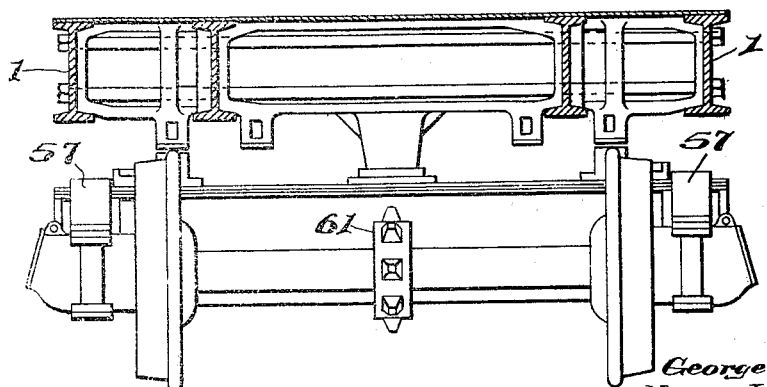

In the accompanying drawings, Figure 1 is a side elevation of a steam shovel having our improvements applied thereto, in one form; Fig. 2 is a plan view of the same; Fig. 3 is a vertical sectional view on an enlarged scale, illustrating the transmission of the power from the main engine-shaft to the sprocket chains; Fig. 4 is a plan view of the propelling shaft and counter-shaft, and the gearing thereon; Fig. 5 is a detail plan view of a portion of the rear end of the machine, partly broken away, and illustrating the steering devices; Fig. 6 is a vertical sectional view of the same; Fig. 7 is a longitudinal sectional view, taken centrally through the forward part of the machine, showing the same mounted on ordinary railway trucks; Fig. 8 is a transverse sectional view, showing the front railway truck in elevation, with the jacks in position for removing the same; and Fig. 9 is a transverse sectional view, showing the rear truck in elevation.

In the accompanying drawings, we have shown our invention as applied to a steam shovel, although it is obviously applicable to other machines of the same general character, and is shown as equipped for use upon the surface of the soil or upon any other suitable roadway or surface not a railway.

1 indicates the body or frame, having the usual boiler 2 and engines 3 thereon.

4 indicates the main engine-shaft, having a pinion 5 which meshes with a gear 6 on the main or hoisting drum shaft. This shaft also carries a gear 8, which meshes with a gear 9 on the propelling shaft 10. These parts are common to most structures of this class, and may be of any approved construction. The gear 9 has secured to it a sleeve 11, which is keyed on the propelling shaft 10, and which is provided with a clutch member 12.

13 indicates an elongated pinion mounted loosely on the shaft 10, so as to slide freely longitudinally thereof, and provided with a clutch member 14 adapted to engage the clutch member 12. Said clutch pinion 13 is provided with a groove 15 in its hub to receive the usual trunnion collar to which the operating lever is pivoted. The pinion 13 meshes with a gear 16 on a counter-shaft 17, supported in bearings 18 removably secured to the under side of the frame or body 1. The shaft 17 extends beyond said frame or body at each side thereof, and its ends are provided with sprocket-wheels 19. Around each sprocket-wheel 19 there passes a sprocket chain 20, which extends to the corresponding front wheel of the machine, the front wheels being the driving-wheels, and being provided with sprocket-wheels by which they are driven. The front axle, 21, is secured to the car body by the same bolts that hold the center plate and side bearings in place when the machine is mounted upon railway trucks, and it results from this construction that the machine may be readily mounted on such trucks by removing the front axle and its wheels, the sprocket chains, the counter-shaft 17 and the gear and sprocket-wheels carried thereby, and the clutch pinion 13. The center bearing plate 55 and side bearing plates 56 are then placed in position and the ordinary railway truck 57 mounted thereon. The usual sprocket sheave 58 is mounted on the propelling shaft 10 in place of the pinion 13 and a sprocket chain 59 extends about said sprocket sheave and about either of the sprocket wheels 60 and 61 on the axles of the front and rear trucks, respectively, and the structure is then propelled in the usual way. The traction driving wheels are indicated as a whole by the reference numeral 22 and their sprocket wheels by the reference numeral 23, and are mounted to turn on journals on the ends of the non-rotating axle 21.

The steering is effected, when the machine is used elsewhere than on railways, by means of the rear wheels 24, which are mounted on the ends of an axle 25, which axle is swiveled to the usual car center plate at 26, by means of a vertical pivot. The swinging of the axle in a horizontal plane is effected by means of an auxiliary engine 27, mounted on the rear of the car and having its shaft 28 connected with a steering shaft 29 by means of any suitable gearing, that which we prefer being a sprocket-wheel 30 on the engine-shaft 28, and a sprocket-wheel 31 on the steering shaft 29, the two connected by a sprocket chain 32. The steering shaft 29 is mounted in a bearing box 33 secured to the under side of the car body 1, and the hub of the sprocket-wheel 31 bears against said box at one end, so as to prevent longitudinal motion of the shaft in one direction. A collar 34 on the shaft 29 bears against the other end of the box and prevents longitudinal motion of the shaft in the other direction. The front or inner end of the steering shaft is connected by a universal joint 35 to a sleeve nut 36, and this sleeve nut has threaded into it a screw shaft 37, which is connected by a universal joint 38 to a clamp or clip 39, secured to the axle 25 at one side of its central pivot. By reason of this connection between the steering shaft 29 and axle 25, rotary movement may be imparted to the sleeve nut in either direction, and such rotation will move the screw shaft either forward or backward, as the case may be, and will swing the axle around its pivot in either direction. The universal joints allow the connecting parts to accommodate themselves to the varying positions of the axle and permit free rotation of the sleeve nut. The engine 27 is reversible, and through it the necessary power is obtained to readily rotate the steering shaft in either direction, thus making it possible to steer the machine with great nicety without calling for any muscular exertion on the part of the operator.

It will be seen that the machine can be readily mounted on railway trucks, so as to be drawn or propel itself along the railway track, and that it may be readily adapted for use on surfaces or roads elsewhere than on railway tracks by removing the railway trucks and applying the axles and ground wheels shown in the accompanying drawings. The change in the propelling mechanism to conform to this change in the wheels can be readily and quickly made, and the steering mechanism is such as to give a ready and complete control of the guiding of the machine.

We do not wish to be understood as limiting ourselves to the precise details of construction hereinbefore described and shown in the accompanying drawings, since these details may obviously be modified without departing from the principle of our invention.

Having thus fully described our invention, what we claim as new and desire to secure by Letters Patent is:—

1. In a steam shovel or the like, the combination, with a car body, and propelling mechanism mounted thereon, means for mounting said body on the usual railway trucks, and means for connecting said propelling mechanism therewith, of axles interchangeable with said trucks and provided with ground wheels, one of said axles having driving wheels operatively connected with the propelling mechanism, the other axle being provided with steering wheels, and steering mechanism controlling said steering wheels, substantially as described.

2. In a steam shovel or the like, the combination, with a car body, and propelling mechanism mounted thereon, means for mounting said body on the usual railway trucks, and means for connecting said propelling mechanism therewith, of non-rotating axles removably connected with said car body, one of said axles being fixed and having driving ground wheels mounted to rotate thereon, the other axle being swiveled and provided with steering ground wheels, means for connecting said driving ground wheels with the propelling mechanism, and a power steering mechanism controlling said swiveled axle, substantially as described.

3. In a steam shovel or the like, a car body having ground wheels provided with sprockets, and a propelling shaft connected with the engines of the machine, said shaft having a clutch member secured thereon, in combination with a clutch pinion loosely mounted on the propelling shaft, a counter-shaft extending through the sides of said body, and provided with a gear to mesh with said pinion and having sprockets at its ends, and sprocket chains connecting said sprockets with the ground wheel sprockets, substantially as described.

4. In a steam shovel or the like, a car body having ground wheels provided with sprockets, and a propelling shaft connected with the engines of the machine, said shaft having a clutch member secured thereon, in combination with a clutch pinion loosely mounted on the propelling shaft, a counter-shaft provided with a gear to mesh with said pinion and having sprockets at its ends, and sprocket chains connecting said sprockets with the ground wheel sprockets, said clutch pinion and counter-shaft and its associated parts being removable, substantially as described.

5. In a steam shovel or the like, a steering mechanism comprising a swiveled axle having ground wheels, a steering shaft, a separate reversible engine operatively connected with said steering shaft, a sleeve nut rotated by said steering shaft, and a screw shaft connected to the axle and engaging said sleeve nut, substantially as described.

6. In a steam shovel or the like, a steering mechanism comprising a swiveled axle having ground wheels, a steering shaft, a reversible engine operatively connected with said steering shaft, a sleeve nut rotated by said steering shaft, and a screw shaft connected to the axle and engaging said sleeve nut, said sleeve nut being connected to the steering shaft and said screw shaft being connected to the axle by universal joints, substantially as described.

7. In a steering mechanism for steam shovels and the like, a car body having a reversible engine mounted thereon and an axle swiveled thereunder and provided with ground wheels, said body being provided with a bearing box, a horizontal steering shaft mounted in said bearing box, provided with means for preventing its longitudinal motion in said box, and operatively connected with the engine, a sleeve nut connected with said steering shaft by a universal joint, and a screw shaft connected to the axle by a universal joint and engaging the sleeve nut, substantially as described.

8. In a steam shovel, the combination, with a car body, and a rear axle swiveled thereunder and provided with ground wheels, of a reversible engine mounted at the rear of said car body with its shaft overhanging said end and provided with a sprocket wheel, a bearing box on the under side of said body, a horizontal steering shaft mounted in said box, in a direction longitudinal of the body, provided with a collar at one end and a sprocket wheel at the other end to bear against the ends of the box and prevent longitudinal motion of the shaft, a sprocket chain connecting the sprocket wheels of the engine and steering shafts, a clip mounted on the steering axle at one side of the pivotal center thereof, a sleeve nut connected to the forward end of the steering shaft by a universal shaft, and a screw shaft connected to the axle clip by a universal joint and engaging the sleeve nut, substantially as described.

In testimony whereof, we affix our signatures in presence of two witnesses.

GEORGE W. KING.
HARRY J. BARNHART.
CHARLES B. KING.

Witnesses:
WILLIAM R. SHISLER,
GEORGE A. CHENEY.